United States Patent [19]
Yamamura

[11] Patent Number: 6,069,562
[45] Date of Patent: May 30, 2000

[54] SECURITY EQUIPMENT FOR AUDIO APPARATUS

[75] Inventor: Yoshitaka Yamamura, Kobe, Japan

[73] Assignee: Fujitsu Ten Limited, Kobe, Japan

[21] Appl. No.: 08/983,230

[22] PCT Filed: Jul. 12, 1996

[86] PCT No.: PCT/JP96/01960

§ 371 Date: Jan. 12, 1998

§ 102(e) Date: Jan. 12, 1998

[87] PCT Pub. No.: WO97/04453

PCT Pub. Date: Feb. 6, 1997

[30] Foreign Application Priority Data

Jul. 14, 1995  [JP]  Japan ................................. 7-178724

[51] Int. Cl.[7] ............................................. G08B 13/14
[52] U.S. Cl. ............................. 340/568.2; 340/568.1; 340/825.31; 340/825.34; 711/164
[58] Field of Search ........................... 340/568.2, 568.1, 340/426, 825.31, 825.34; 711/164

[56] References Cited

U.S. PATENT DOCUMENTS

| | | | |
|---|---|---|---|
| 4,720,700 | 1/1988 | Seibold et al. | 340/568.1 |
| 5,297,268 | 3/1994 | Lee et al. | 711/164 |
| 5,732,237 | 3/1998 | Ikeda | 340/825.31 |
| 5,835,015 | 11/1998 | Ikeda | 340/568 |
| 5,864,528 | 1/1999 | Ikeda et al. | 340/825.34 |
| 5,870,018 | 2/1999 | Person et al. | 340/568.2 |

FOREIGN PATENT DOCUMENTS

| | | |
|---|---|---|
| 3-259454 | 11/1991 | Japan . |
| 3295049 | 12/1991 | Japan . |
| 4205965 | 7/1992 | Japan . |
| 4-271064 | 9/1992 | Japan . |
| 4-319570 | 11/1992 | Japan . |
| 5144161 | 6/1993 | Japan . |
| 6176474 | 6/1994 | Japan . |
| 6321018 | 11/1994 | Japan . |
| 7182840 | 7/1995 | Japan . |
| 7320287 | 12/1995 | Japan . |

*Primary Examiner*—Jeffery A. Hopsass
*Assistant Examiner*—John Tweel, Jr.
*Attorney, Agent, or Firm*—Christie, Parker & Hale, LLP

[57] ABSTRACT

The invention relates to an equipment for preventing an audio apparatus being locked, when it becomes impossible to read in TOC information because of a fault or faults in a disk or an equipment for reproducing the disk. A security equipment for audio apparatus which releases a security operation based on a result of a comparison between a read in TOC information and a previously stored TOC information, the security equipment stopping a judgement on the TOC information when a failure is detected in the disk or the equipment for reproducing the disk (R1–4) at the time of reading in the TOC information. Thereby, the audio apparatus is not locked when the TOC information is read in, because the TOC information which was read in (R5) without a mechanical error, is correct.

4 Claims, 5 Drawing Sheets

SECURITY EQUIPMENT FOR AUDIO APPARATUS

TECHNICAL FIELD

The present invention relates to security equipment for an audio apparatus, particularly for protecting an audio apparatus for a vehicle from theft.

BACKGROUND ART

Various equipments for protecting an audio apparatus for a vehicle from theft have been proposed since such apparatuses are often stolen.

Among the various equipments proposed are security equipment for which a user can easily release a security operation even while the audio apparatus is executing the security operation without decreasing security performance. A security equipment making use of TOC (TABLE OF CONTENTS) information of a compact disc (hereinafter referred to as "CD") and the like is proposed in Japanese patent application PH5-327672 (Published Unexamined Patent Application (Kokai) PH7-182840).

The security equipment making use of the TOC information is explained below.

The TOC information is information recorded on a read in area of a CD and the like. As shown in FIG. 5, the CD comprises a read in area 31, a data area 32, a read out area 33. The TOC information is recorded on a read in area 31, and it contains characteristic data (the number of music tracks, the start of music data, and the playing time) of the disk.

In order to set the security mode of the audio apparatus, TOC information of the prescribed CD is previously written into a memory of the audio apparatus, for example, an electrically erasable programmable ROM (EEPROM) and the like.

If the audio apparatus is stolen from the vehicle under the condition that the security mode is set, the security operation is executed as follows. When the audio apparatus is stolen from the vehicle, the audio apparatus is disconnected from the vehicle battery. The security equipment detects this change of connecting condition with the battery by a change of power source and stores it. When the audio apparatus is fitted to another vehicle and connected again to a battery, the security equipment executes the security operation because the fact that the battery has been once disconnected is stored. If the security operation is executed, the audio apparatus becomes inoperable and does not accept switching operation, etc. except when a special operation is executed.

Therefore, if a person other than the user takes the audio apparatus away from the vehicle, the person cannot use the apparatus. By displaying on the vehicle or on the apparatus that such a security function is provided, it reduces the likelihood of theft.

However, if the security mode is set, it may occur that the audio apparatus becomes inoperable even while a user uses the audio apparatus properly, because the security operation may be triggered by the discharge of the vehicle battery and the like.

In order to reset the inoperable condition, the user inserts the CD used for setting up the security mode or an identical CD into the CD player of the audio apparatus. The security equipment reads in the TOC information from the inserted CD, and if it is identical to the TOC information recorded in the memory, the security equipment resets the inoperable condition and the audio apparatus can be used as usual.

On the other hand, even though a person who stole the audio apparatus connects the audio apparatus to a battery and tries to operate it, it cannot be used since it is in an inoperable condition as described above. For example, even if a CD is inserted into the CD player, the chance that the inserted CD is identical to the CD which was used to set up the security mode is very small. Thus if any other CD is inserted, the TOC information of the inserted CD is not identical with the TOC information in the memory. Therefore, the release of the security operation is not executed and the audio apparatus is kept inoperable.

When the insertion of a CD, which is not the prescribed CD, is repeated more than a defined number of times (i.e., five times or ten times), the inoperable condition cannot be released, and thus raises the reliability of the security.

If the user forgets or loses the CD which was used for setting the security mode, the security mode can be released according to the proper process of carrying it in to a dealer or the like.

SUMMARY OF THE INVENTION

In the conventional security equipment described above, when the security operation is executed and the audio apparatus is in an inoperable condition, a user inserts the prescribed CD and releases the inoperable condition. The security equipment reads in the TOC information of the CD. However, there may occur cases where the security equipment cannot read in the TOC information because there is a fault in the disk or the reproduction apparatus for the disk.

In this case, according to the conventional security equipment, it continues the operation for reading in the TOC information until the TOC information can be read in. Therefore, the audio apparatus is locked under the above condition, and cannot enter the next operation. A user is able to recognize, for the first time, that the equipment has failed when this condition continues for a long time. In order to release the above condition, the operation for reconnecting the electric power, etc. should be made.

When there is a fault in the disk or the apparatus for reproducing the disk, even if the TOC information can be read in, there is a possibility of an erroneous judgement because the TOC information is erroneously read in.

Therefore, the purpose of the invention is to prevent the audio equipment from being locked when the TOC information cannot be read in, because, in the security equipment for the audio apparatus using the TOC information, the operation for reading in the TOC information becomes impossible because of faults in the disk or the reproduction apparatus for the disk.

Further, the purpose of the invention is to increase the reliability of security in the security equipment for the audio apparatus using the TOC information, by not judging based on the erroneous TOC information, when there are faults in the disk or the apparatus for reproducing the disk.

To accomplish the above purposes, the present invention comprises, in the security equipment for the audio apparatus which releases the security operation based on the result of the comparison between the read in TOC information and the previously stored TOC information, a means which detects a failure in the disk or the equipment for reproducing the disk when the TOC information is read in, and a means for stopping the judgement concerning the TOC information.

Thereby, when the audio apparatus mechanism fails, the reading in of the TOC information is stopped. Therefore, the audio apparatus is not locked under the condition of reading in the TOC information. The user may then easily enter the operation for correcting the failure.

According to the invention, in addition to the above, the security equipment may comprise a means to execute the judgement on the TOC information when the reading in means reads in the TOC information without detecting a failure. The TOC information, which is read in when the disk or the apparatus for reproducing the disk has failed, may be incorrect. However, if the judgement is made based oil the correct TOC information which is read in when a failure is not detected the judgement with respect to the release and the continuation of the security operation will be executed correctly.

According to the invention, the security equipment may comprise a means which detects a condition where there is no disk in the predetermined place (e.g. the first tray of a CD autochanger) when the TOC information is read in, a means which stops the judgement on the TOC information when the above detecting means detects the no disk condition. Thereby, the security operation may not be released when the inoperable condition is not reset by the regular process by a user. Thus the invention may increase the reliability of the security.

Further, according to the invention, when the said detecting means detects a failure or the prescribed condition, it may demand that the user inserts the prescribed disc by displaying that the disk or the apparatus for reproducing the disk has a fault or faults. Thereby, the user may return the apparatus to the normal condition promptly by reinserting the disk.

As described above, according to the invention, in the security equipment for the audio apparatus using the TOC information, it can be prevented that the audio apparatus becomes locked when the TOC information cannot be read in because there is a failure in the disk or the apparatus for reading the disk.

In the security equipment for the audio apparatus, where the disc or the apparatus for reading the disc has failed, the reading in of the TOC is stopped. Therefore, since the judgement is not made based on the erroneous TOC information, the reliability of the security can be increased.

When the condition without a disk in the prescribed place is detected, the judgement on the TOC information is stopped. Therefore, when the inoperable condition is not released by the regular process, the release of the security is not made, and thereby the reliability of the security is increased.

Further, since a request for a change of the disk is displayed for the user when a failure is detected, the user may change the disk promptly in response to the display.

DETAILED DESCRIPTION OF THE INVENTION

Hereinafter, embodiments of the present invention will be explained by referring to the accompanying drawings.

Figure 3:
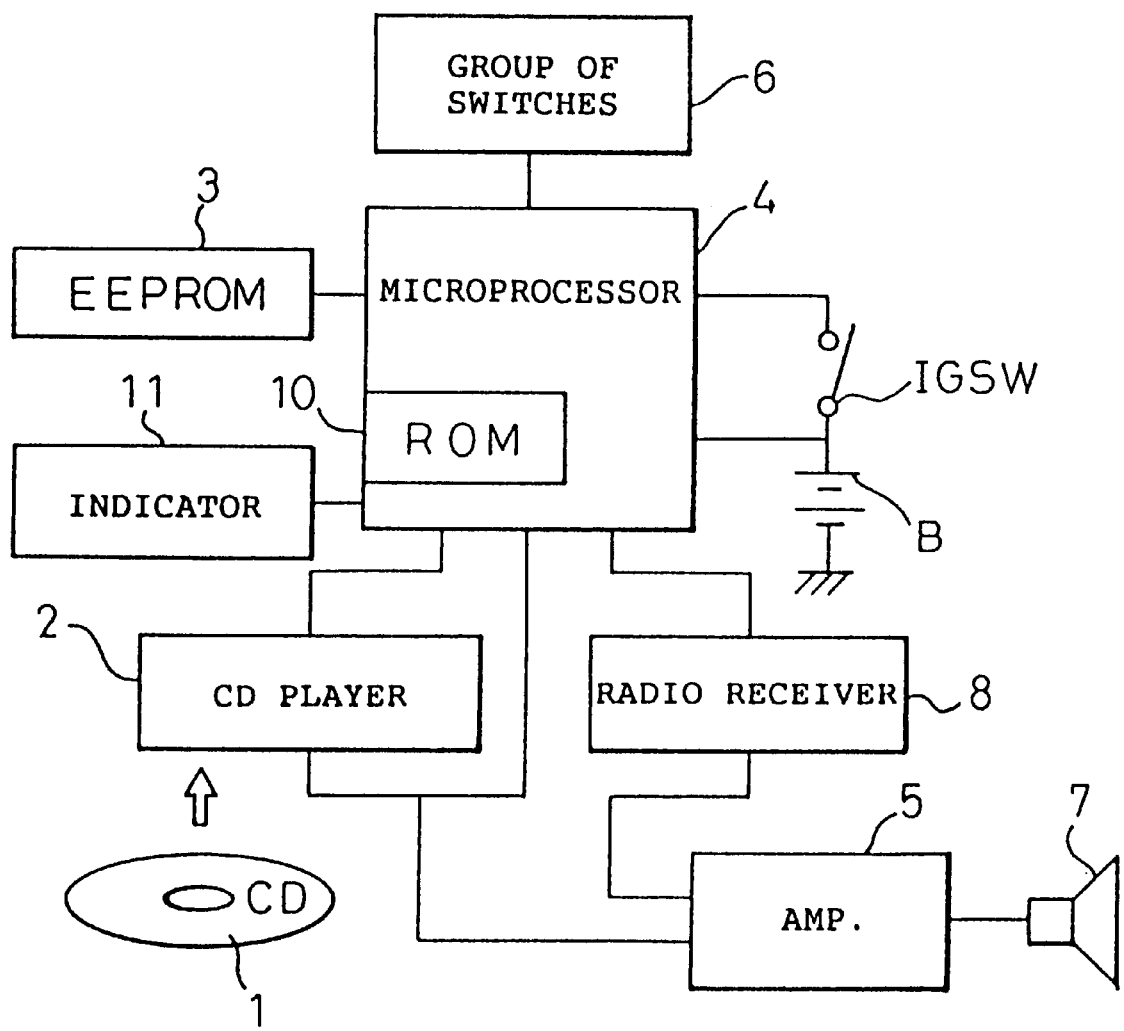
FIG. 3 is a block diagram of an embodiment of the audio apparatus according to the present invention.

FIG. 3 illustrates a block diagram of an audio apparatus. The audio apparatus shown in FIG. 3 comprises a CD player, and the TOC information is read in from the CD. However, the present invention may be applied to a digital audio disk player, a digital audio tape player, etc. other than the CD player in which the TOC information is recorded.

The illustrated audio apparatus comprises a CD player 2 which reads the information in the CD 1, reproduces an audio signal and reads out the read in information, a radio receiver 8 which receives a radio broadcasting, an amplifier 5 which amplifies an audio signal from the CD player 2 and the radio receiver 8 and outputs a signal to a speaker 7, the microprocessor 4 which controls the CD player 2, the radio receiver 8, the amplifier 5 and the security related operation, an EEPROM 3 which stores the information for releasing the security operation, and the indicator 11.

A microprocessor 4 is connected through the ignition switch IGSW or directly to batteries B, and is always monitoring the connecting condition with the batteries B. ROM 10, in which programs, etc. are stored, is included in the microprocessor 4.

Figure 4:
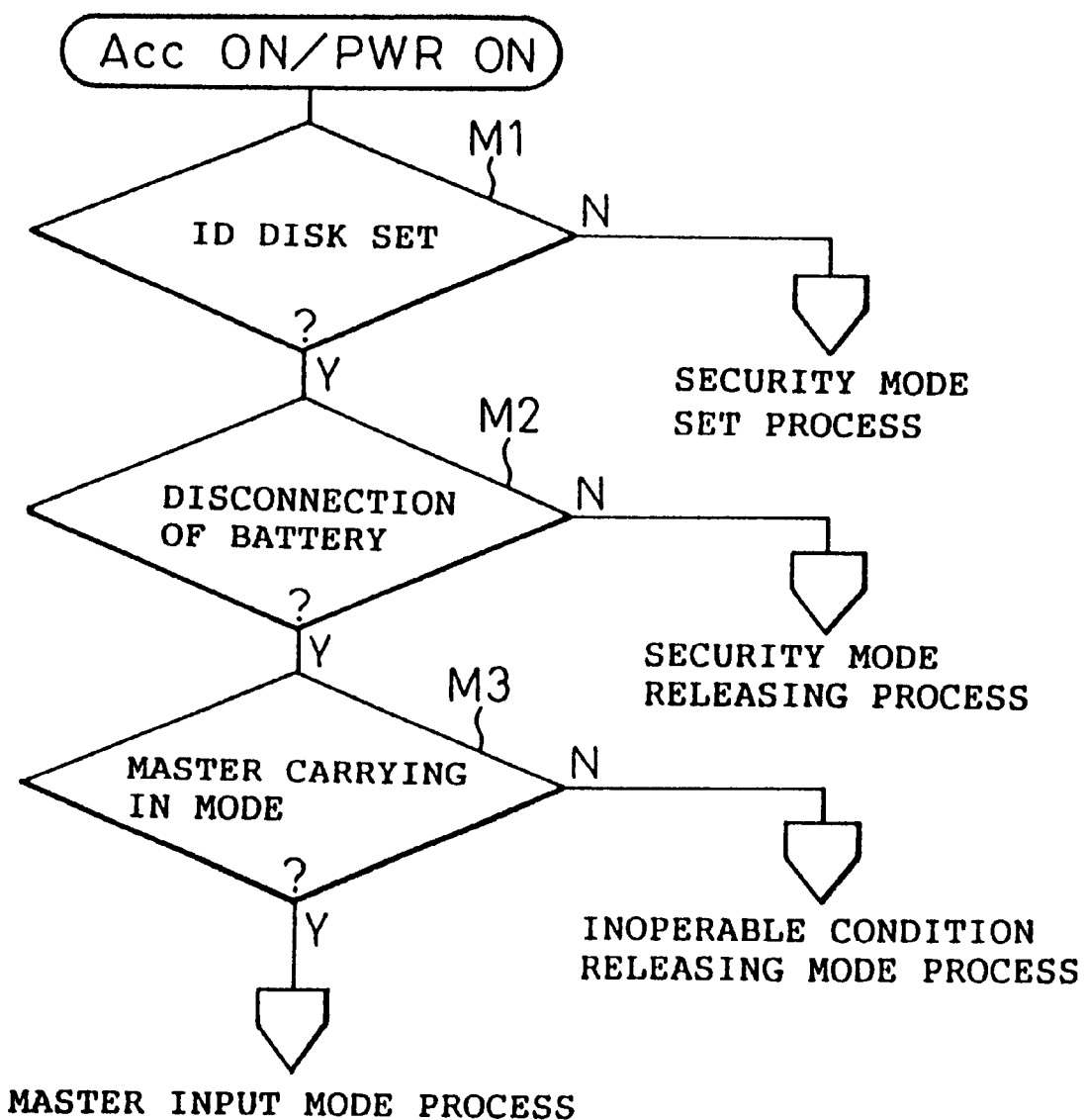
FIG. 4 is a flow chart (part 3) explaining the operation of an embodiment of the equipment according to the present invention.

FIG. 4 illustrates a flowchart which shows a main routine of the process performed by the microprocessor 4. The process shown in the drawing starts when the audio apparatus becomes operable by the operation of the ignition key IGSW or an on-operation of the power source switch of the audio apparatus.

At the step M1, it is judged whether the security mode is set or not. It is judged that the security mode is set, if the TOC information is written in the EEPROM 3, and it is judged that the security mode is not set, if the TOC information is not written.

Figure 5:
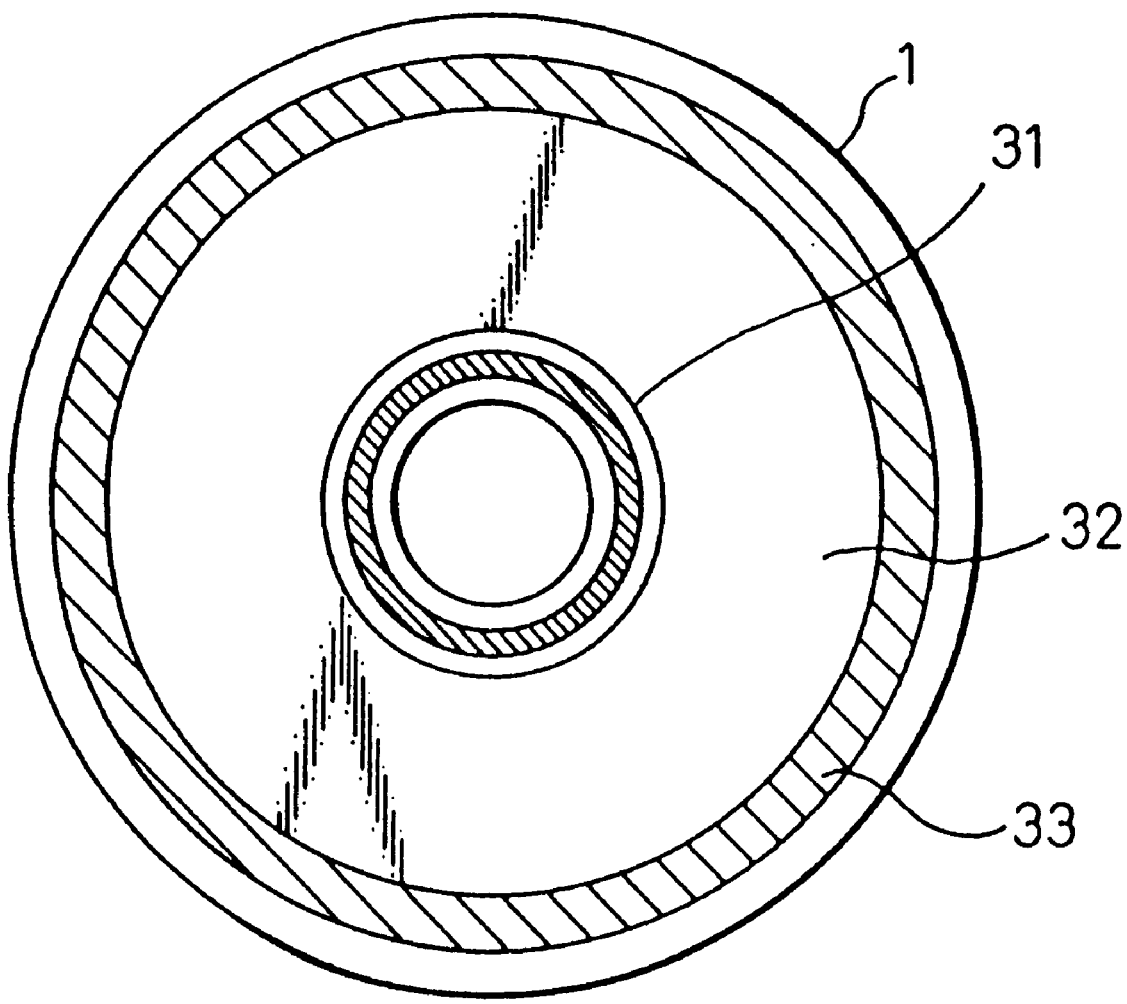
FIG. 5 is a record format of a CD.

If the security mode is not set (N of the step M1), the audio apparatus is available as usual without setting the security mode. In this condition, it is possible to set the security mode. This setting is performed, by the user, by means of selecting the specified compact disc (ID disc) and storing the contents (TOC data) recorded in the read-in area 31 (FIG. 5) into the memory EEPROM 3 of the audio apparatus shown in FIG. 3.

If, at step M1, the security mode is set, it is judged whether the connection between the audio apparatus and the batteries has been disconnected or not. The microprocessor 4 always monitors the voltage of the connecting terminal with the batteries B, and, when a voltage drop has been detected, the microprocessor stores data indicating that a voltage drop has occurred. If it is detected, in step M2, it is judged that the batteries were disconnected.

If the batteries were not disconnected (N of step M2), the audio apparatus becomes available under the security mode as being set. In this condition, it is also possible to proceed to the process for releasing the security mode. The security mode can be released by erasing the TOC data stored in the EEPROM of FIG. 3 (goes to the initial condition).

If it is judged that the disconnection with the batteries occurred at step M2, the security equipment performs the security operation and the audio apparatus is in the inoperable condition. Next, it is judged, at step M3, if it is under "a master carrying in mode", that is, it is judged whether the inoperable condition should be released using the master disc, etc. or not. If it is judged at step M3 that it is not under "a master carrying in mode", the user performs the process for releasing the inoperable condition. That is, releasing the inoperable condition by inserting the prescribed CD (ID disc), and making the audio apparatus available as usual. If it is under "a master carrying in mode" at step M3, the user carries in the audio apparatus into a shop, etc., and has to release the inoperable condition using the master disc, etc.

The process for releasing the inoperable condition will be explained later. "A master carrying in mode" is set when the process for releasing the inoperable condition is improperly performed (e.g. a CD other than the prescribed CD is inserted a number of times exceeding the prescribed number of times).

Figure 2:
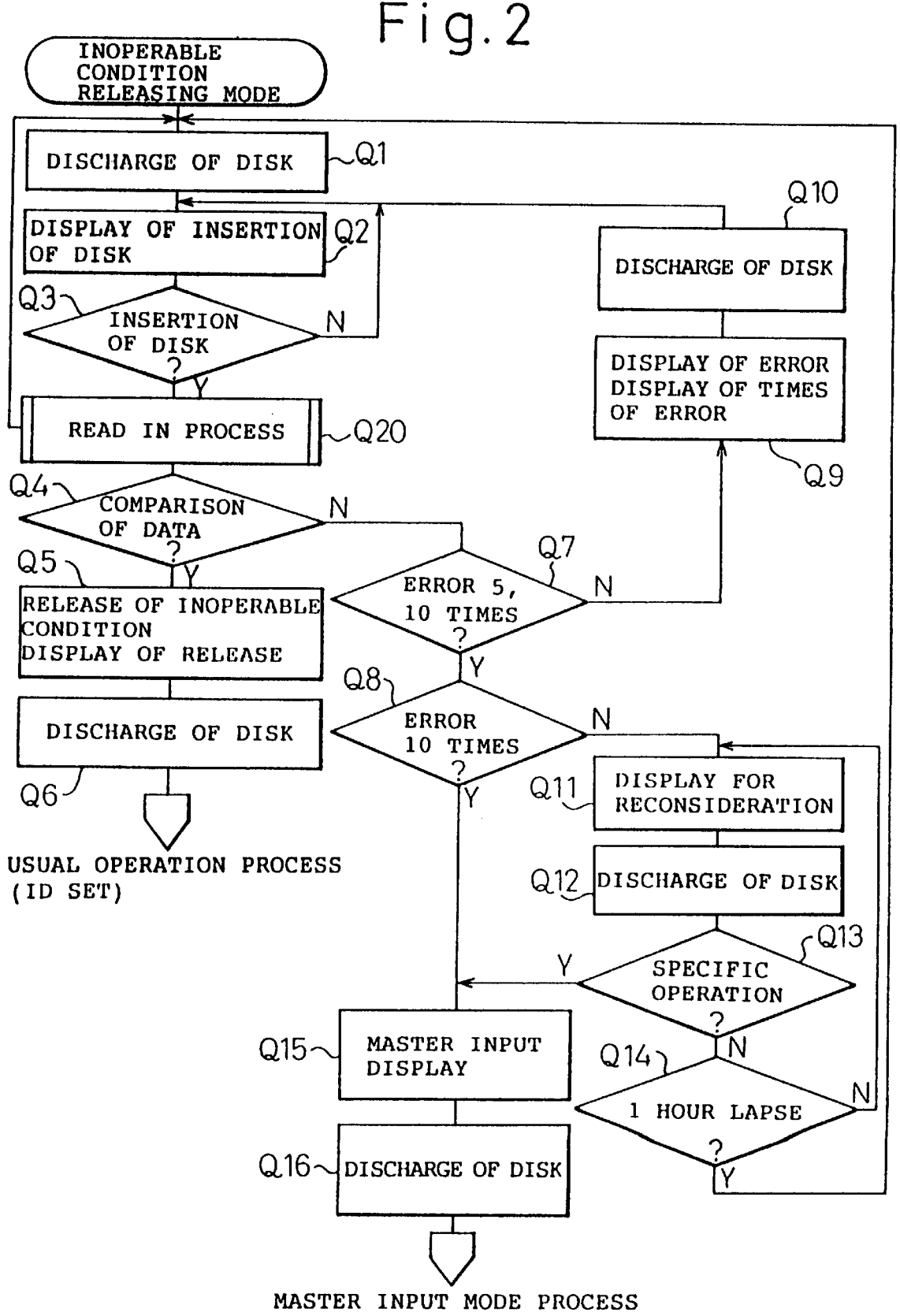
FIG. 2 is a flow chart (part 2) explaining the operation of an embodiment of the equipment according to the present invention.

The process for releasing the inoperable condition is explained by referring to FIG. 2. The process shown in FIG. 2 is the same as explained in the above described Japanese Patent Application PH5-327672 (Published Unexamined Patent Application (Kokai) PH7-182840) except that the step Q20 is inserted between step Q3 and step Q4.

When entering into the mode for releasing the inoperable condition, if a disk is in the CD player, the process for discharging it is performed at step Q1. At step Q2, in order to prompt the insertion of the disk, the display "DISK" is lit on the indicator 11, step Q3 and step Q2 are repeated, and the player waits for the insertion of the disk. When the disk is inserted, the control proceeds from the step Q3 to step Q20.

The contents of step Q20 will be described later. The TOC information is read in at step Q20. When the reading in starts, the display "DISK" on the indicator is turned off.

At step Q4, a comparison between the read in TOC information and the TOC information recorded in the memory is performed, if they are coincident, the inoperable condition is released at step Q5 and the indicator 11 displays that the inoperable condition is released, and the disk is discharged at step Q6. Hereafter, the audio apparatus is available under the condition that the security mode is set.

If the read in TOC information and the TOC information recorded in the memory are not coincident at step Q4, the control goes to the step Q7. After that, the process prompting the insertion of the normal CD is performed, the control goes to the step Q5 from the step Q4 if the normal CD is inserted. However, when a CD which is not normal is repeatedly inserted, the control is proceeded to "the master input mode" process compulsorily or by a optional operation, "master input" is displayed on the indicator 11 at step Q15, then the disk is discharged at step Q16.

The audio apparatus enters the master input mode under the condition that the inoperable condition is continued and the audio apparatus becomes not available, if the inoperable condition is not released according to the normal way at a dealer, etc. The process after the above step Q7 will be described below.

At step Q7, it is judged if both of the TOC data do not coincide five times or ten times continuously, further it is also judged at step Q8 if both of the TOC data do not coincide ten times continuously. When both of the TOC data do not coincide ten times continuously, the control goes to step Q15, then the display of a failure or a recommendation to go to the dealer, etc. is made. After the compact disk is discharged at step Q16, the control goes to the master input mode process.

When both of the TOC data do not coincide ten times continuously, the control goes to the step Q11, the display for prompting the reconsideration as to if the inserted compact disk is the ID disk, is made, and the compact disk is discharged at step Q12. At step Q13, it is judged if the compulsory transfer operation to the master input mode is performed. If it is performed, the control transfers to the step Q15. If it is not performed, it is judged, at step Q14, if one hour has passed since the reconnecting of the CD player 2 with the batteries B. The processes from step A11 to step Q13 are repeated, the control returns to the step Q1 after one hour and continues the process. The compulsory transfer operation to the master input mode is performed by the prescribed specific operation.

When the number that both of the TOC data do not coincide is other than a continuous five times or ten times, the control transfers to the step Q9, the display of unreadable, or the display that the disk is different from the ID disk and the number of times of the errors, is made. The compact disc is discharged at step Q10, and the control returns to the step Q2, then continues the process.

Next, by referring to FIG. 1, the step Q20 of FIG. 2 will be explained.

Figure 1:
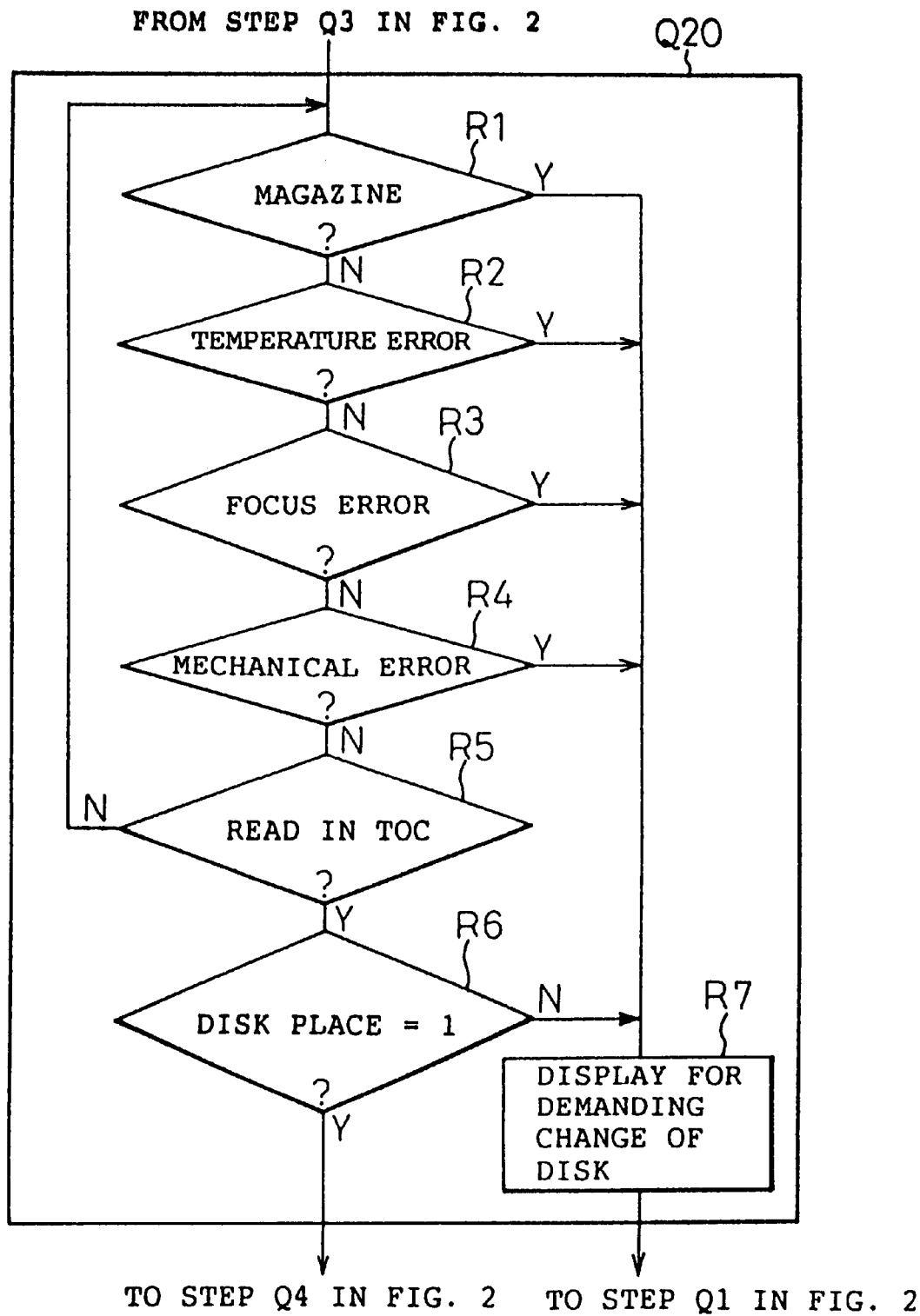
FIG. 1 is a flow chart (part 1) explaining the operation of an embodiment of the equipment according to the present invention.

The operation shown in FIG. 1 starts following the insertion of the disk at the step Q3 shown in FIG. 2. At steps R1–R4, errors in the disk or the equipment for reproducing the disk are checked.

At step R1, it is judged if a magazine of the CD autochanger is installed. At the step R2, it is judged if there is a temperature error. The temperature sensor detects whether a temperature exceeds the temperature at which the security equipment works normally, and it is judged that there is a temperature error when it is exceeded.

At the step R3, it is judged if there is a focus error. At the step R4, it is judged if there is a mechanical error, such as the CD does not rotate or the changer does not work normally, etc.

If even one error is detected at the steps R1–R4, the control goes to the step R7 without performing the read in of the TOC information, and the display demanding a change of the disk is made by the indicator. When a failure is not detected at the steps R1–R4, the control goes to step R5.

At the step R5, it is judged if the TOC information was read in from the inserted disk. When the TOC information is not read in, the control returns to the step R1.

When the TOC information was read in, it is checked that if the position of the disk is at the first tray of the CD autochanger at step R6. When it is in the tray 1, the control goes to the step Q4 of FIG. 2, and, as explained above, the read in TOC information is compared with the TOC information recorded in the memory. When the disk is not in the tray 1 at the step R6, the control goes to the step R7.

At step R7, the indicator 11 displays "DISK" and turns it on and off, in order to remind the user to change the disk, and the control returns to step Q1 of FIG. 2. The user recognizes the turning on and off of the indication that the read in of the disk was not normally performed, and again performs a process such as the insertion of the disk, etc.

With respect to the means for performing the steps R1–R6 explained above, the CD player 2 or the microprocessor 4 comprises the said means, and they are also used for other purposes.

According to the embodiment explained above, when the TOC information is not read in because of the mechanical error, etc., the control may go to the next process without being locked as it conventially occurred. Since the TOC information is not read in erroneously because the mechanical error was previously detected, the TOC information is correct when the TOC information is read in. Therefore, the TOC information is judged correctly and the reliability of the security can be increased.

What is claimed is:

1. A security equipment for audio apparatus which releases or continues a security operation based on a result of a judgement of a comparison between a read-in TABLE OF CONTENTS (TOC) information and a previously stored TOC information, the security equipment for the audio apparatus comprising:

detecting means which detects a failure in a disk or an equipment for playing the disk when the TOC information is read in;

stopping means which stops the judgement on the TOC information when the detecting means detect the failure.

2. The security equipment for audio apparatus according to claim 1 further comprising:

performing means which performs the judgement on the TABLE OF CONTENTS (TOC) information when the TOC information is read-in without detecting the failure by the detecting means.

3. A security equipment for audio apparatus which releases or continues a security operation based on a result of a comparison between a read-in TABLE OF CONTENTS (TOC) information and a previously stored TOC information, the security equipment of the audio apparatus comprising:

detecting means which detects a condition that no disk is in the prescribed place when the TOC information is read in;

stopping means which stops the judgement on the TOC information when the detecting means detect the condition.

4. The security equipment for audio apparatus according to claim 1 or 3 further comprising:

display means which displays that there is a fault or faults in the disk or the equipment for playing the disk when the detecting means detects the failure or the condition.

* * * * *